Patented Feb. 24, 1948

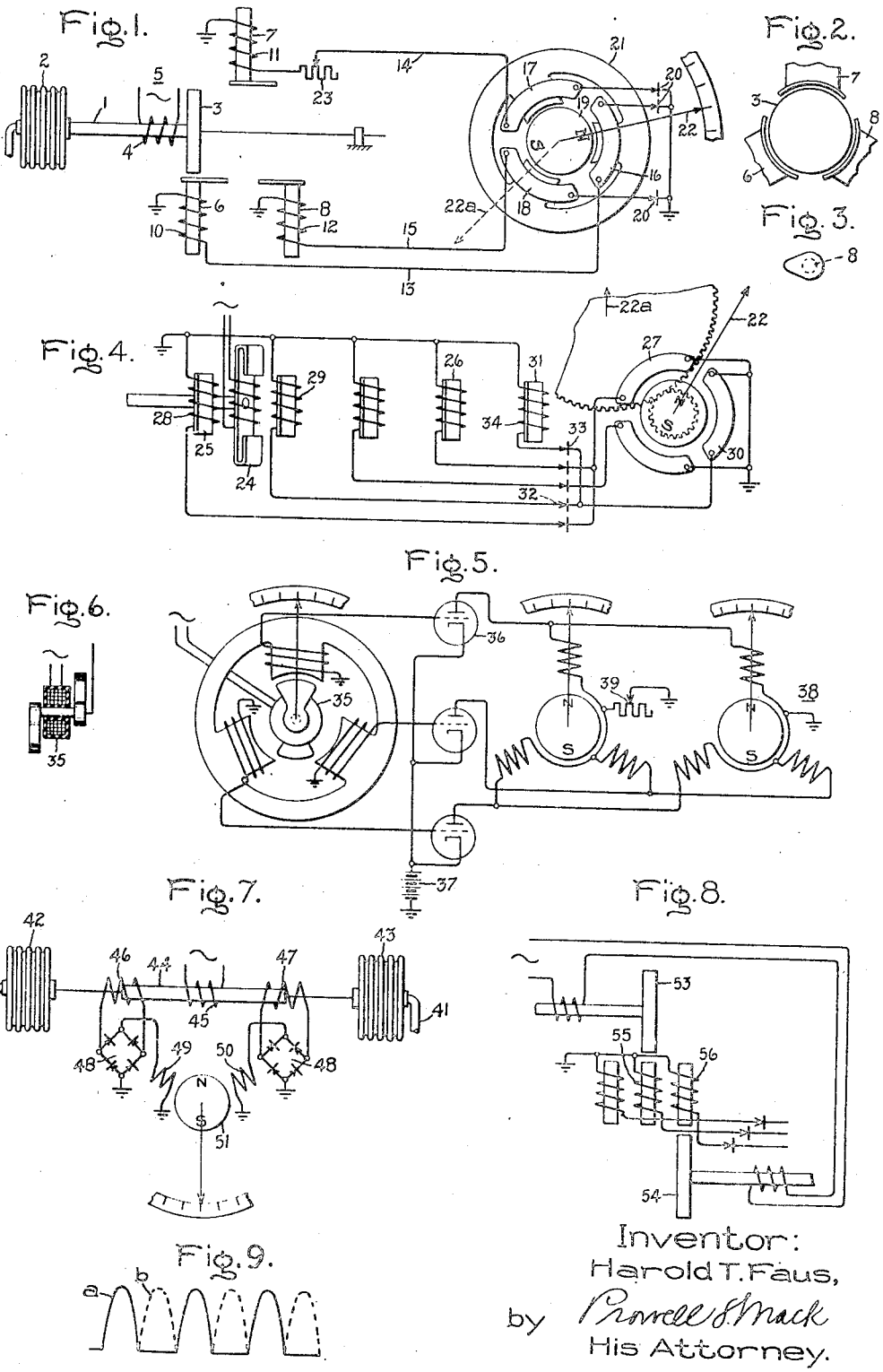

2,436,639

UNITED STATES PATENT OFFICE 2,436,639

ALTERNATING CURRENT TELEMETERING TRANSMITTER

Harold T. Faus, Lynn, Mass., assignor to General Electric Company, a corporation of New York Application September 22, 1945, Serial No. 617,992

2 Claims. (Cl. 177—351)

My invention relates to telemetering apparatus employing an alternating current type of transmitter and a direct current type of receiver in which certain advantages of both such types of apparatus are employed. For example, the system is advantageous when it is desirable to produce a large movement in the receiver where only a small movement in the transmitter is possible. In carrying my invention into effect, I employ a transmitter which makes use of variable voltage transformer action and produces two or more single phase alternating currents which are relatively variable in magnitude. Such currents are rectified and used to feed the coils of a high sensitivity direct current polarized indicating instrument of the ratio type, preferably having a polarized rotor. Both the transmitter stator and its moving element may be designed so as to have no moving coil parts, thus avoiding the use of slip rings or the like. The transmitter may have linear or rotary motion; and unidirectional, reversible, continuous, or intermittent motion may be transmitted. A transmitter may average a plurality of movements, and a plurality of receivers may be operated from one transmitter. Half or full wave rectification may be employed, and the rectifying apparatus may be located at any desired point in the telemetering system.

The features of my invention which are believed to be novel and patentable will be pointed out in the claims appended hereto. For a better understanding of my invention, reference is made in the following description to the accompanying drawing in which Fig. 1 represents an embodiment of my invention for transferring linear into limited rotary motion. Fig. 2 represents an end view of a transmitter of the type represented in Fig. 1 to indicate a desired compactness of assembly. Fig. 3 represents how the pole shoes of the transmitter may be shaped to obtain desired scale distributions in the receiver. Fig. 4 shows another modification of my invention for transferring linear motion into rotary motion extending over 360 degrees or more if desired. Fig. 5 represents a modification of my invention for transferring rotary motion into similar rotary motion and employing amplifier type rectifiers. Fig. 6 shows a preferred construction of the transmitter of Fig. 5 to avoid the use of a rotary winding. Fig. 7 shows the use of my invention for measuring differential pressure by linear motion and converting the measurement to a rotary deflection at a remote point. Fig. 8 represents a transmitter where two linear motions are averaged, and Fig. 9 shows rectified current curves for the purpose of explaining certain advantages of employing half wave rectification.

Referring now to Fig. 1, the movable magnetic core element of the transmitter is represented at 1 and is intended to have a linear horizontal movement in accordance with the motion or measurement to be transmitted, represented as that of a pressure sensitive bellows device 2. The movable core member 1 has an enlarged head or pole piece 3 and is excited by a stationary coil 4 energized from an alternating current source 5. The part 1 is represented at the extremity of its movement to the left with its pole shoe 3 opposite a stationary pole piece 6, and is adapted to move to the right past a second stationary pole piece 7 to a point opposite a third stationary pole piece 8. The stationary pole pieces are wound with secondary coils 10, 11, and 12 connected to ground at one end and over wires 13, 14, and 15 to the coils 16, 17, and 18 of a distant receiver having a rotary polarized armature 19. The other side of the coils of the receiver is connected to ground through one-way rectifiers 20. The rectifiers may be connected in the circuits at any point. The receiver will have its stationary coils wound on the radial pole pieces of a stationary magnetic yoke 21.

It will now be evident that secondary voltages may be induced in the coils 10, 11, and 12 of the transmitter by transformer action, with the coil 4 acting as the primary winding of the transformer, and with the magnitude of such voltages in the different secondary coils varying with the position of the movable pole piece 3. In the position shown, coil 10 of the transmitter will have maximum induced voltage, and coil 11 will have a much smaller induced voltage, and coil 12 none at all. Hence, at the receiver, coil 16 will have maximum current and coil 17 a smaller current and coil 18 none at all. These currents are pulsating direct currents because of the presence of the rectifiers 20, so that the fluxes in the stator of the receiver will be unidirectional. In the illustration it is assumed that the receiver coils are wound to produce south poles adjacent the rotor and hence will attract the north pole of the polarized rotor 19, while the return flux produced by coils 16 and 17 will pass around the stator yoke and produce a north pole at the stator pole face about which coil 18 is wound. Thus with coils 16 and 17 producing south poles with coil 16 predominating, the rotor 19 will seek a position substantially as illustrated in Fig. 1. When pole piece 3 of the transmitter is opposite coil 11 and midway between coils 10 and 12, coil 17 of the receiver will predominate and attract the north pole of the rotor 19, corresponding to a mid-deflection position. At this time coils 16 and 18 of the receiver will receive some voltage and attempt to produce weak south poles opposite the rotor 19, but such flux will be reduced by the return flux of opposite polarity produced by coil 17, so that relatively speaking, the magnetic poles at coils 16 and 18 will be north relative to that produced at coil 17. When transmitter pole 3 is opposite pole 8 and coil 12, coil 18 of the receiver will receive maximum current and the pointer 22 of the receiver will have some such position as is indicated by dotted line 22a. When transmitter pole 3 is midway between transmitter stator poles 7 and 8, coils 17 and 18 of the receiver will receive about equal currents with little or none in coil 16, resulting in a corresponding rotor deflection with pointer 22 pointing about horizontally to the left. The scale distribution at the receiver can be controlled as desired by the positioning of the stator poles at the receiver and the shaping of their pole pieces. Thus Fig. 3 represents an end view of the pole shoe of stator pole 8, Fig. 1, with the pole shoe elongated to the left. If the pole shoe be rotated 180 degrees so as to be elongated to the right, it is evident that it will have an effect upon the scale distribution at the receiver in relation to the linear position of transmitter pole piece 3. As represented in Fig. 1, the receiver will have a deflection of the order of 215 degrees for movement of transmitter pole piece 3 from the position shown to a position opposite pole 8, and the scale distribution may be made uniform for corresponding uniform linear movement of the receiver by proper positioning of the pole pieces or shaping the stator pole shoes in transmitter or receiver, or both. Likewise, the maximum current relation in the three coils of the receiver may be varied for this purpose as by inserting an adjustable resistance 23 in the circuit of the center coil 17.

To reduce the over-all size of the transmitter and improve its transformer efficiency, its stationary pole pieces may be grouped in a circle about the axis of movement of pole shoe 3 as indicated in an end view, Fig. 2, and can be placed closer together and even be made to overlap in the linear direction of movement of the pole piece 3 if desired. Hence, very small linear movements at the transmitter can be reproduced as large angular movements at the receiver. It is to be observed that owing to the polarized rotor in the receiver and the use of rectifiers in the telemetering circuit, the receiver rotor will never take a position 180 degrees from that intended, or, in other words, cannot get out of synchronism or phase with the transmitter while the system is energized. If the system be de-energized and the receiver rotor displaced 180 degrees from correct position, it will return to correct position as soon as the system is again energized.

The system of Fig. 1 may be extended by adding more stationary coils and secondary coils to the transmitter as represented in Fig. 4. While five such coils have been shown, the number may be increased indefinitely to provide one or more complete revolutions in the receiver for full movement in the transmitter. The transmitter is otherwise slightly modified in that the movable primary pole piece 24 is arranged to substantially close the transformer magnet circuit when opposite a stationary pole piece such as 25. It is further noted that every fourth stationary secondary pole piece of the transmitter has its coils connected in parallel through one-way rectifiers to the same coil of the receiver, such as the coils on cores 25 and 26 feeding coil 27 of the receiver. In the position of the parts shown, coils 28 and 29 of the transmitter are feeding coils 30 and 27 of the receiver. Movement of the transmitter core 24 to a position midway between cores 26 and 31 of the transmitter will produce a complete rotation of the receiver armature, etc. Where many rotations of the receiver in a given direction are provided for, the receiver may have an auxiliary pointer 22a geared down to the shaft of the receiver armature to indicate the approximate linear position of the transmitter and which, with the main pointer 22, indicates the exact linear position.

In this modification where there are a plurality of secondary transmitter coils connected in parallel, it is desirable to us one-way rectifiers and place them as shown between the transmitter coils and the common telemetering line connections because, as thus arranged, the coils of the transmitter which are connected in parallel provide no short circuit path for the useful current. Thus the voltage induced across coil 29 which is in a direction to push current through rectifier 32 cannot flow back through rectifier 33 and coil 34 and vice versa. There is generally a further advantage in using one-way rectifiers from an economy standpoint which applies to all modifications of the invention, which will be apparent from the following. In Fig. 9 let the full line half waves $a$ represent the current flowing in transmitter coil 10 and receiver coil 16 of Fig. 1. Since the receiver has no zero return spring but is essentially a ratio instrument, the positioning torque available can be considered as being measured by the height of the current pulses $a$. Now assume that we use full wave rectifiers in Fig. 1 (as can be done as shown in Fig. 7) to produce in addition to the current pulses $a$, the current pulses $b$ shown in dotted lines in Fig. 9. By so doing, the average current flowing in the transmitter and receiver coils in a given period of time will be doubled, but the maximum instantaneous positioning torque will be essentially the same as before although acting every half cycle instead of every other half cycle. However, since no zero return spring is necessary in the ratio type receiver instrument, there is no tendency for the receiver rotor to move out of its correct position during the half cycle in which no current flows where one-way rectifiers are used. Hence, from a positioning torque standpoint half wave rectifiers are as good as full wave rectifiers, and the power used is reduced, and the heating of the coils in transmitter and receiver is very materially reduced. Thus, if the instruments are designed for a continuous current rating of, say, one ampere, I can use one-way rectifiers and step the current pulses up to about 1½ amperes maximum, increasing the useful torque in proportion without overheating. It is of course necessary that the one-way rectifiers be poled in the same direction, so that direct current pulsations in different coils of the receiver will occur simultaneously or in the same half cycle instead of alternately in alternate half cycles. In special cases as where the movement to be transmitted is very irregular and rapid and a low frequency source of supply is used, it may be desirable to use full wave rectification but in most cases there will be a distinct advantage in using one-way rectification.

Fig. 5 represents a further modification of my invention where the transmitter has rotary instead of linear motion. The primary coil 35 of the transmitter may be made stationary by using an axial yoke portion between the pole pieces as shown in the sectional side view, Fig. 6. Another innovation represented in Fig. 5 is the use of amplifier type rectifiers 36 and a separate source of direct current supply 37. This may be desirable when the motion is to be transmitted over considerable distances or where several receivers 38 are to be operated from the same transmitter as indicated in Fig. 5. The plurality of receivers may have corresponding coils connected either in series or parallel, and where connected in parallel, a proper current division between receivers may be had by using resistance in series with those that tend to take more than a necessary amount of current as indicated at 39, Fig. 5. The use of multiple receivers is applicable to the other modifications shown.

Fig. 7 represents a simple form of the invention for measuring the differential pressure in two pressure systems 40 and 41. The pressure difference is caused to operate through Sylphon bellows 42 and 43 to move the core 44 of a differential transformer device having a primary coil 45 and secondary coils 46 and 47. It is to be noted that no moving coils are involved and that the single core is common to both primary and secondary windings. While full wave rectifiers 48 are shown supplied by the secondary windings, half wave rectifiers may be preferable for reasons heretofore stated. The two secondary windings feed direct current to the two coils 49 and 50 of a ratio instrument having a polarized armature 51. It is evident that if the coils produce a south pole field adjacent the armature, their attraction for the north pole field of the armature will produce a deflection corresponding to the ratio of the coil currents and to the difference in pressure between systems 40 and 41.

In Fig. 8, I have shown how a transmitter may have its secondary windings energized in response to the movement of two primary pole pieces 53 and 54 having their windings connected in series in such direction as to induce secondary voltages in the secondary windings which are in phase. Thus, in the position shown, equal voltages, which are in phase, will be induced in secondary coils 55 and 56, and in the receiver the result will be the same as if a single primary pole piece were used and positioned midway between coils 55 and 56. If a receiver like that used in Fig. 1 is employed and the movement of the transmitter primary pole pieces each has a range of linear movement between the outer secondary pole pieces, the receiver will produce a deflection which indicates the average of the positions of the two transmitter pole pieces.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a telemetering system an alternating current transmitter comprising a transformer device having a plurality of secondary windings and two primary windings, means for energizing the primary windings in series, a movable magnetic core for progressively coupling one of said primary windings with the secondary windings, and a second magnetic core movable independently of the first-mentioned core for progressively coupling the other primary winding with the secondary windings, connections for coupling said secondary windings to a receiver through one-way rectifiers such that currents may flow in said secondary windings in only one direction, the two primary windings being connected so as to induce inphase voltages in the secondary windings.

2. In a telemetering system an alternating current transmitter comprising a transformer device having a plurality of secondary windings and two primary windings, means for equally energizing the primary windings from the same alternating current source, a movable magnetic core for progressively coupling one of said primary windings with the secondary windings, and a second magnetic core for progressively coupling the other primary winding with the secondary windings said cores being movable independently of each other, connections for coupling said secondary windings to a receiver through rectifiers, said two primary windings being connected so as to induce inphase voltages in the secondary windings.

HAROLD T. FAUS.

REFERENCES CITED

The following references are of record in the file of this patent:

UNITED STATES PATENTS

| Number | Name | Date |
| --- | --- | --- |
| 849,698 | Radtke | Apr. 9, 1907 |
| 1,706,149 | Ellis | Mar. 19, 1929 |
| 1,941,615 | Mirick | Jan. 2, 1934 |
| 2,050,446 | Meyer | Aug. 11, 1936 |
| 2,151,718 | Riggs | Mar. 28, 1939 |
| 2,379,417 | Conrad | July 3, 1945 |
| 2,418,193 | Peterson | Apr. 1, 1947 |

FOREIGN PATENTS

| Number | Country | Date |
| --- | --- | --- |
| 472,259 | Great Britain | Sept. 20, 1937 |
| 205,573 | Germany | Jan. 5, 1909 |